(12) United States Patent
Howes et al.

(10) Patent No.: US 7,682,114 B2
(45) Date of Patent: *Mar. 23, 2010

(54) PARALLEL SHAFT STRAP TIE DOWN APPARATUS AND SYSTEM

(75) Inventors: Philip Bryan Howes, Braselton, GA (US); Neil H. M. Robertson, Lawrenceville, GA (US); David Trenbeath, Buford, GA (US)

(73) Assignee: Cottrell, Inc., Gainesville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/206,203

(22) Filed: Sep. 8, 2008

(65) Prior Publication Data

US 2009/0196707 A1    Aug. 6, 2009

Related U.S. Application Data

(63) Continuation of application No. 12/025,417, filed on Feb. 4, 2008.

(51) Int. Cl.
*B60P 7/08* (2006.01)

(52) U.S. Cl. .............................. 410/20; 410/7; 410/12; 410/19; 410/23; 410/100; 410/103

(58) Field of Classification Search ............... 410/7–12, 410/19, 20, 22, 23, 100, 103; 248/499; 254/217, 254/223, 369; 24/265 CD
See application file for complete search history.

(56) References Cited

U.S. PATENT DOCUMENTS

| | | | |
|---|---|---|---|
| 4,045,002 A | | 8/1977 | Miller |
| 4,960,353 A | * | 10/1990 | Thorndyke .................. 410/20 |
| 5,800,105 A | | 9/1998 | Stump |
| 6,848,871 B1 | | 2/2005 | Cottrell |
| 7,114,897 B1 | | 10/2006 | Boydstun, IV et al. |
| 7,360,978 B2 | | 4/2008 | Howes |
| 2006/0263160 A1 | | 11/2006 | Howes |
| 2006/0263161 A1 | | 11/2006 | Howes |

\* cited by examiner

*Primary Examiner*—Stephen Gordon
(74) *Attorney, Agent, or Firm*—Cantor Colburn LLP (57) ABSTRACT

A parallel shaft strap tie down apparatus and system. Exemplary embodiments include a parallel shaft strap tie down apparatus and system for vehicle transports. Exemplary embodiments include a central shaft having a ratchet wheel and a pawl configured to wrap a strap around the central shaft. A parallel shaft is positioned parallel to the central shaft. The strap can be inserted between a variable gap between the central shaft and the parallel shaft. When the central shaft is rotated the strap is wound around the central shaft and the parallel shaft, both of which cooperate to create a self-tightening response of the strap on the central and parallel shafts.

1 Claim, 12 Drawing Sheets

PARALLEL SHAFT STRAP TIE DOWN APPARATUS AND SYSTEM

CROSS REFERENCE TO RELATED APPLICATION

This application is a continuation application of U.S. Ser. No. 12/025,417, filed Feb. 4, 2008, the disclosure of which is incorporated by reference herein in its entirety.

BACKGROUND

The present invention relates generally to automobile and cargo transport, and more particularly, to a parallel shaft strap tie down apparatus and system.

Figure 1:
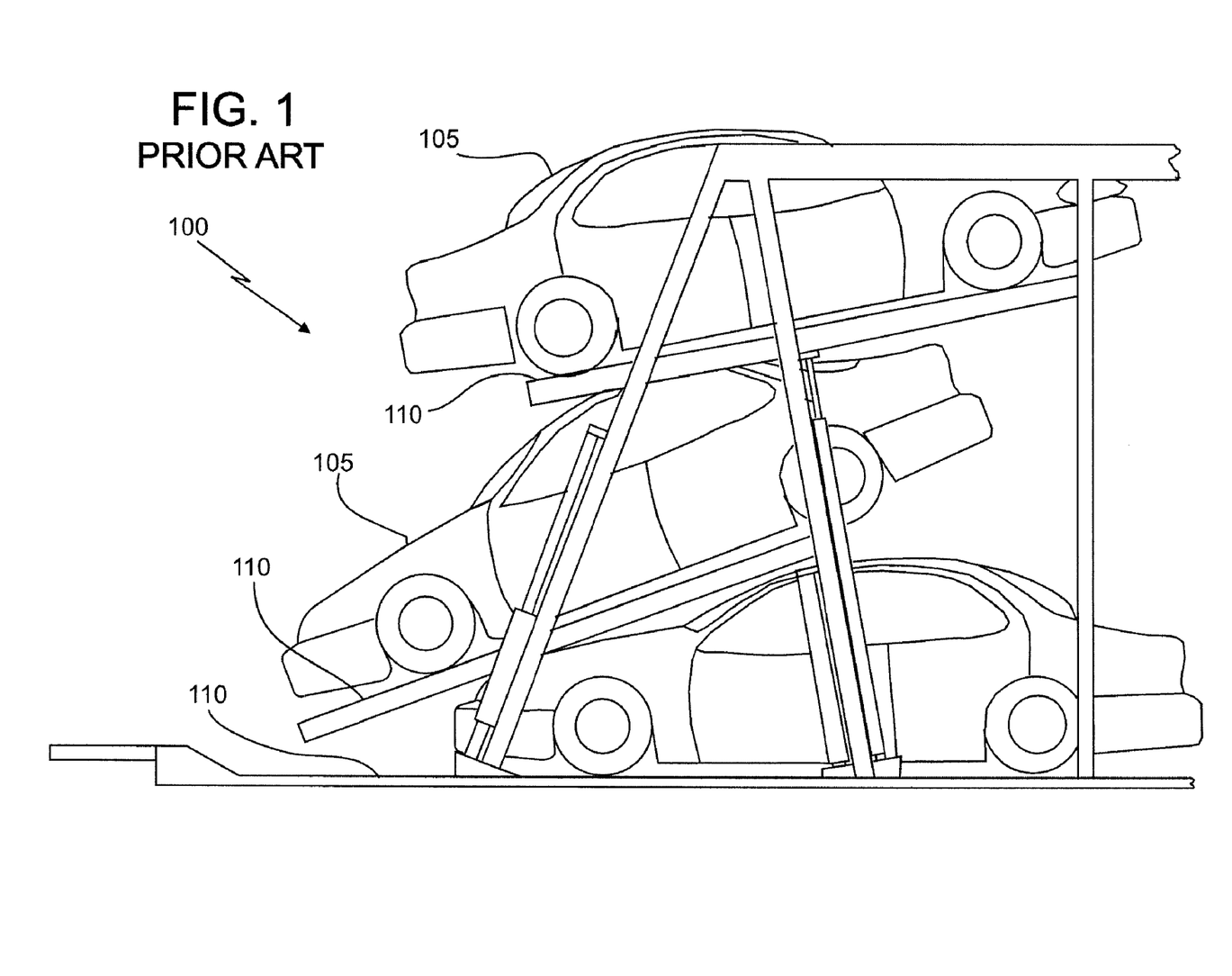
FIG. 1 illustrates a prior art vehicle transport trailer.

FIG. 1 illustrates a prior art vehicle transport trailer 100. Several vehicles 105 can be transported on the trailer. Each of the vehicles typically has its own platform 110 onto which each vehicle 105 is secured.

Figure 2:
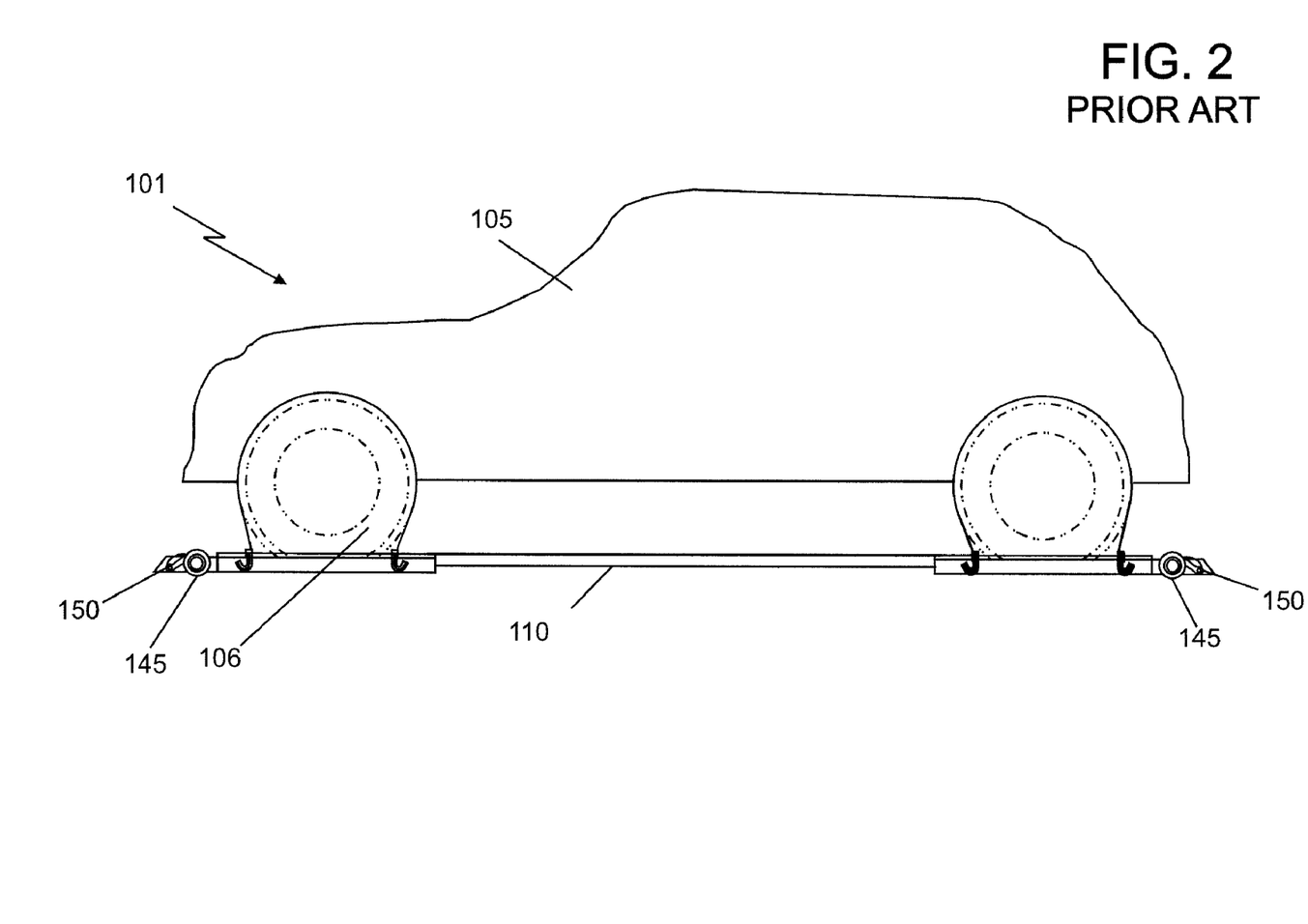
FIG. 2 illustrates a side view of a prior art vehicle trailer tie down system.

FIG. 2 illustrates a side view of a prior art vehicle trailer tie down system 101. As previously described, each vehicle 105 is secured to its platform 110. FIG. 2 illustrates the vehicle 105 tied to its platform 110 by straps 115 arranged around each wheel 106 of the vehicle 105. The vehicle 105 is typically restrained to the platform 100, and therefore the trailer, by arranging the straps 115 to the wheels 106 of the vehicle 105 and the platform 110 or other part of the trailer. The straps 115 are placed in tension to prevent movement.

Figures 3, 4, 4A:
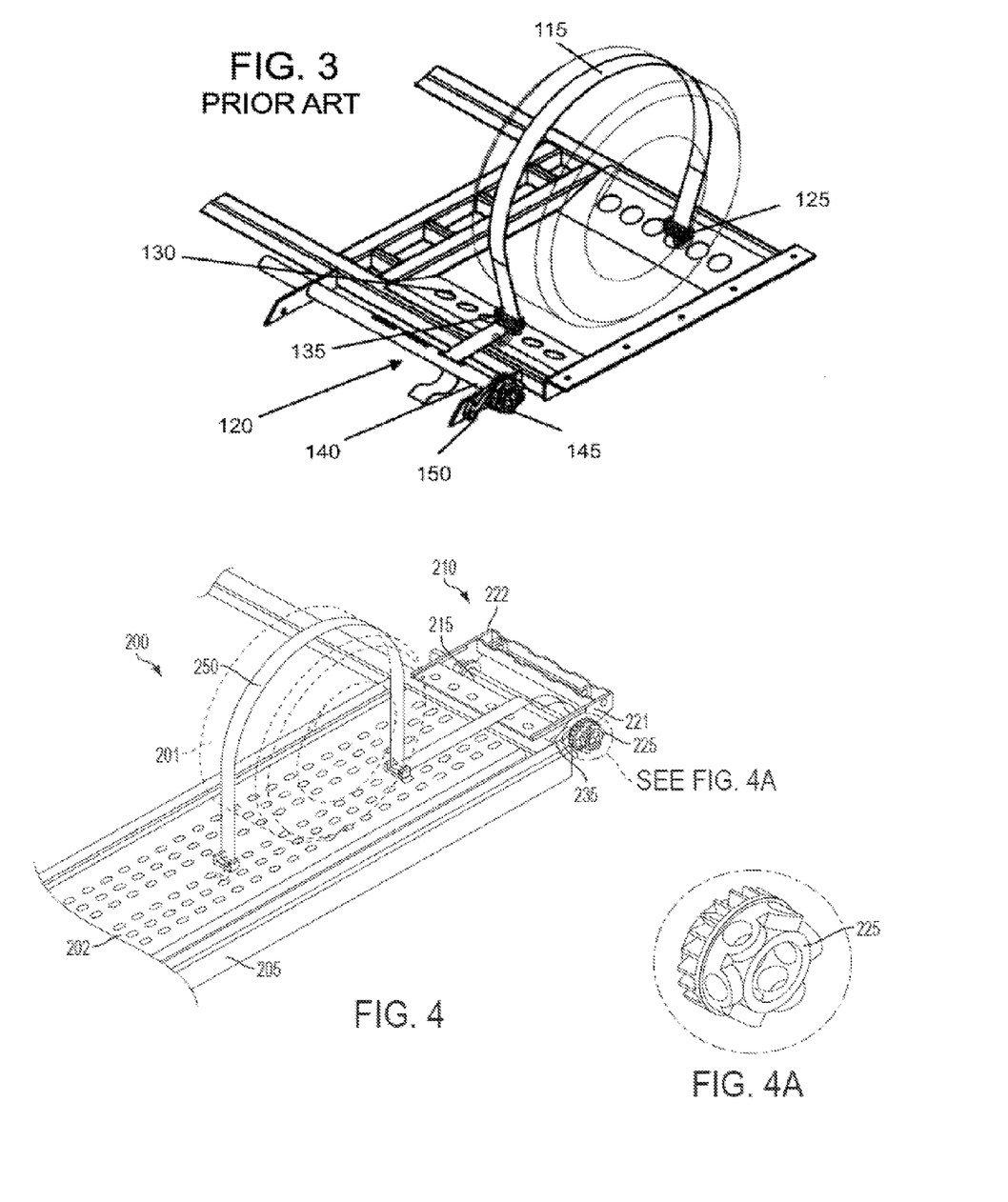
FIG. 3 illustrates a top perspective view of the prior art vehicle trailer tie down system of FIG. 2.
FIG. 4 illustrates a perspective view of an exemplary embodiment of a parallel shaft strap tie down system.

FIG. 3 illustrates a top perspective view of the prior art vehicle trailer tie down system 101 of FIG. 2. Currently, locking mechanisms 120 are implemented to keep the straps 115 from loosening due to forces acting upon the vehicle 105 (e.g. gravity, centripetal and other forces asserted on the vehicle 105 from the trailer or otherwise). There are many types of mechanisms 120 such as ratchet and clamping devices that are typically manually tightened. For example, one end of the strap 115 can be connected to a fixed hook 125 that can be fixed to multiple slots 130 on the platform 110. The strap 115 can then be routed through an intermediate hook 135 also placed in one of the multiple slots 130 on the platform 110. The strap 115 can then be connected to a shaft 140 of the mechanism 120. Current ratchet 145 and pawl 150 mechanisms are implemented to tighten the strap 115 around the shaft.

BRIEF SUMMARY

Exemplary embodiments include a strap tie-down apparatus, including a first shaft, a second shaft parallel and coupled to the first shaft, wherein the second shaft is radially moveable with respect to the first shaft and a ratchet wheel coupled to an end of the shaft.

Additional exemplary embodiments include a strap tie down apparatus, including a first shaft, shaft plates connected perpendicular to the first shaft, a second shaft disposed between the shaft plates and parallel to the first shaft, the second shaft configured to rotate within the shaft plates and further configured to move radially into contact with the first shaft and a ratchet wheel coupled to an end of the shaft.

Further exemplary embodiments include a strap tie down apparatus, including an elongated shaft, shaft holes disposed in the elongated shaft, a U-shaft having a middle leg and contiguous end legs, wherein the end legs are each disposed in the shaft holes, and wherein the middle leg is configured to move radially in contact with the elongated shaft and a ratchet wheel coupled to an end of the shaft.

Further exemplary embodiments include a strap tie down system for a vehicle transporter having one or more vehicle platforms, the system including a first shaft coupled to one of the one or more vehicle platforms, shaft plates coupled and perpendicular to the first shaft, a second shaft disposed between the shaft plates thereby positioning the second shaft parallel to the first shaft, wherein the second shaft is radially moveable with respect to the first shaft and a ratchet wheel coupled to an end of the first shaft, wherein the first shaft is configured to receive a strap that is adjustable longitudinal to the first shaft, wherein the second shaft includes a central portion having a first end and a second end, the first and second ends being at least one of concentrically and non-concentrically arranged with the central portion, wherein the first end and second end have a radius that is less than a radius of the central portion, wherein the first and second ends are disposed in slots disposed on the shaft plates.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Exemplary embodiments include a parallel shaft strap tie down apparatus and system for vehicle transports. Exemplary embodiments include a central shaft having a ratchet wheel and a pawl configured to wrap a strap around the central shaft. A parallel shaft is positioned parallel to the central shaft. The strap can be inserted between a variable gap between the central shaft and the parallel shaft. When the central shaft is rotated the strap is wound around the central shaft and the parallel shaft, both of which cooperate to create a self-tightening response of the strap on the central and parallel shafts.

Figure 5:
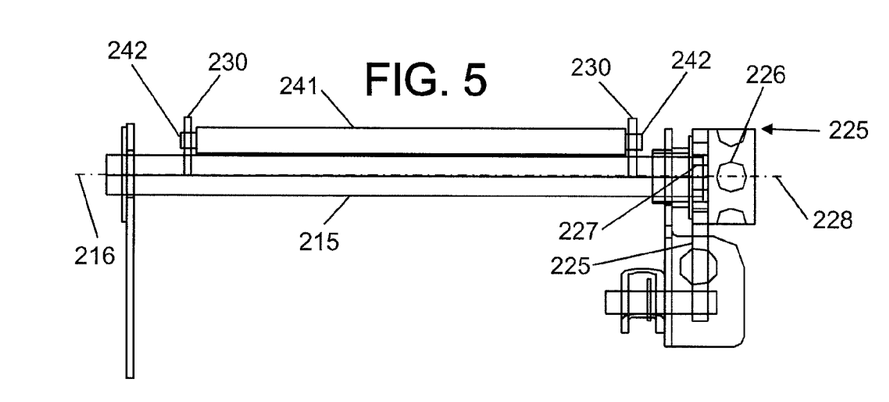
FIG. 5 illustrates a top down view of the parallel shaft strap tie down system of FIG. 4.

FIG. 4 illustrates a perspective view of an exemplary embodiment of a parallel shaft strap tie down system 200. The system 200 includes a platform 205 with a parallel shaft strap tie-down apparatus 210 coupled to the platform 205. FIG. 5 illustrates a top down view of the parallel shaft strap tie down apparatus 210 of FIG. 4. The apparatus 210 includes a central shaft 215 that is free to rotate with respect to the platform 205, and in between support plates 221, 222. The apparatus 210 includes a ratchet wheel 225 having wrench apertures 226 into which a tightening bar can be inserted to tighten the ratchet wheel as known in the art. The ratchet wheel 225 further includes engagement teeth 227 for engagement with a pawl 235 as known in the art. The ratchet wheel 225 is coupled to the central shaft 215 with a central axis 216 of the central shaft 215 concentric with an axis 228 of the ratchet wheel 225. In exemplary embodiments, the central shaft 215 can have a circular or non-circular (e.g., hexagonal) cross section.

Figure 6:
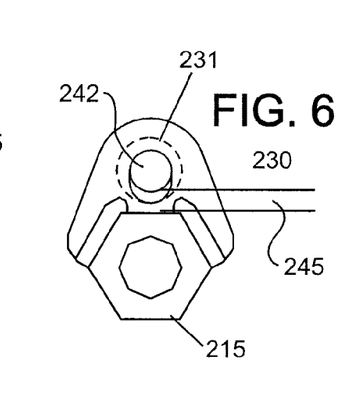
FIG. 6 illustrates a side view of the central shaft and shaft plates of FIG. 5.
Figure 7A:
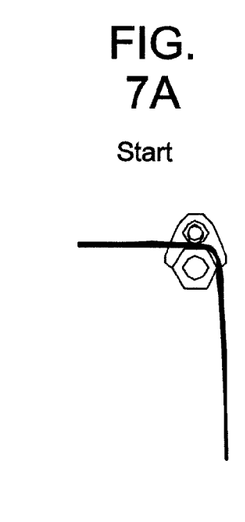
FIGS. 7A-7F illustrates a wrap sequence of the parallel shaft strap tie down apparatus of FIGS. 4-6 in accordance with exemplary embodiments.
Figure 7B:
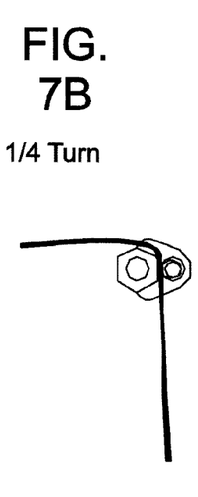
Figure 7C:
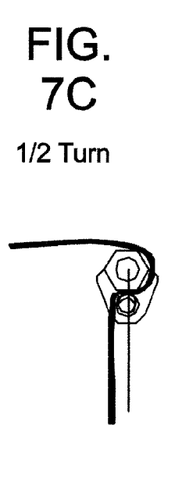
Figure 7D:
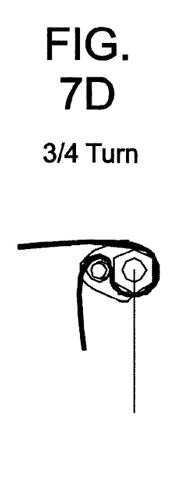
Figure 7E:
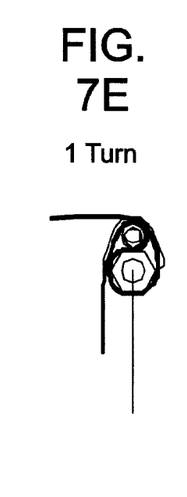
Figure 7F:
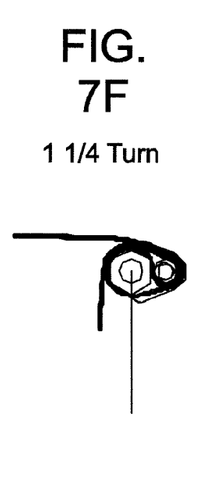

In exemplary embodiments, shaft plates 230 are coupled to the central shaft 215. In exemplary embodiments, the shaft plates 230 are coupled to the central shaft 215 orthogonally (e.g., perpendicular to the central shaft 215). FIG. 6 illustrates a side view of the central shaft 215 and shaft plates 230 of FIG. 5. The shaft plates 230 include slots 231. A parallel shaft 240 is positioned parallel to the central shaft 215 and is constrained by the slots 231. The parallel shaft includes a central portion 241 and ends 242, which are positioned within the slots 231. In exemplary embodiments, a radius of the central portion 241 is greater that a radius of the ends 242 and of the slots 231. In addition, the central portion 241 is concentric with the ends 242. In exemplary embodiments, the radius of the slots 231 is greater than the radius of the ends 242. In this way, the parallel shaft 240 can be in contact with the central shaft 215 or spaced away from the central shaft 215, depending on the position of the parallel shaft 240 within the slots 231. In exemplary embodiments, a strap 250 is confined to a space 245 between the shaft plates 230 laterally and the central shaft 215 and parallel shaft 240 radially. In exemplary embodiments, rotation of the central shaft 215 causes the parallel shaft 240 to pinch down on the strap 250, resulting in a self-tightening action. A winch end of the strap 250 is continuously adjustable. Ends of the strap 250 around the wheel 201 are incrementally adjustable in a series of slots 202 in the platform 205. In exemplary embodiments, a fixed hook 255 and an intermediate hook 260 can be placed in the appropriate slot 202 when positioning the wheel 201 on the platform prior to tightening the strap 250.

FIG. 7 illustrates a wrap sequence of the apparatus 210 as described herein. In a start position the strap 250 is positioned between the central shaft 215 and the parallel shaft 240. In the start position the parallel shaft 240 rests on the strap 250 that rests on the central shaft 215. In a ¼ turn, the parallel shaft 240 may begin to move within the slots 231 and away from the strap 250 and the central shaft 215. In a ½ turn, the parallel shaft 240 falls under the force of gravity from the strap 250 and the central shaft 215. In a ¾ turn, the parallel shaft 240 may begin to move toward the strap 250 and the central shaft 215 once again. In a full turn, the strap 250 comes into contact with itself and the parallel shaft 240 falls against the strap and the central shaft 215 under the force of gravity and a tension force of the strap in its self-tightening response between the central shaft 215 and the parallel shaft 240. Subsequent turns such as a 1¼ turn further tighten the strap 250 onto the central shaft 215 and parallel shaft 240.

Figure 8:
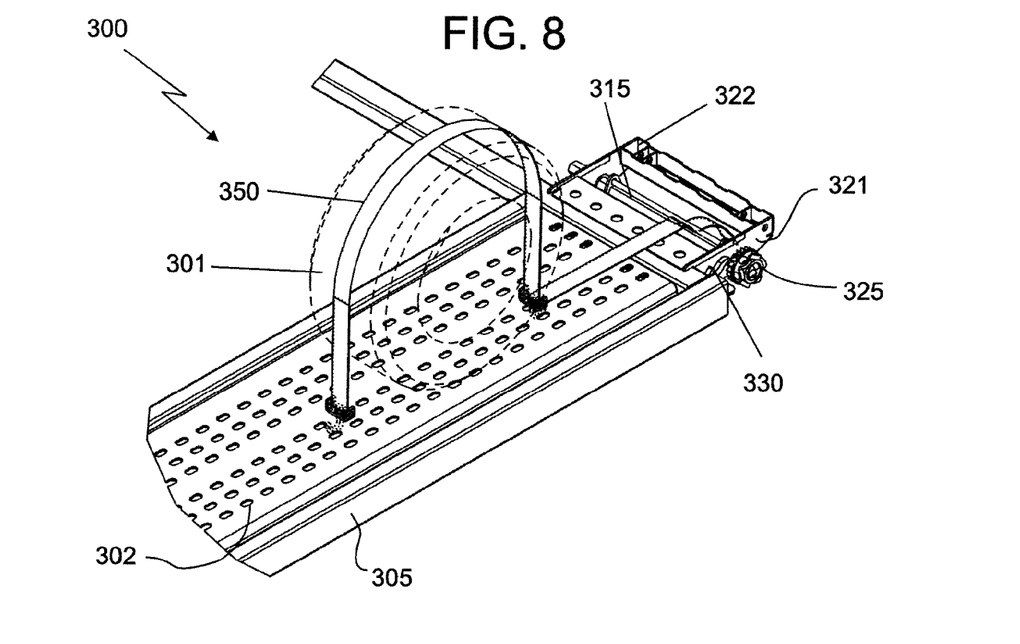
FIG. 8 illustrates a perspective view of an exemplary embodiment of a parallel shaft strap tie down system.
Figure 9:
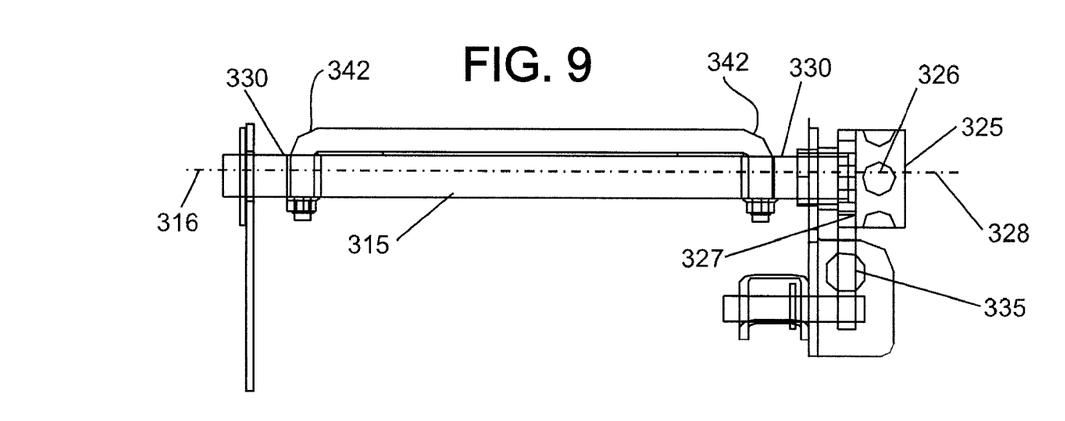
FIG. 9 illustrates a top down view of the parallel shaft strap tie down apparatus of FIG. 8.

FIG. 8 illustrates a perspective view of an exemplary embodiment of a parallel shaft strap tie down system 300. The system 300 includes a platform 305 with a parallel shaft strap tie-down apparatus 310 coupled to the platform 305. FIG. 9 illustrates a top down view of the parallel shaft strap tie down apparatus 310 of FIG. 8. The apparatus 310 includes a central shaft 315 that is free to rotate with respect to the platform 300, and in between support plates 321, 322. The apparatus 310 includes a ratchet wheel 325 having wrench apertures 326 into which a tightening bar can be inserted to tighten the ratchet wheel as known in the art. The ratchet wheel 325 further includes engagement teeth 327 for engagement with a pawl 335 as known in the art. The ratchet wheel 325 is coupled to the central shaft 315 with a central axis 316 of the central shaft 315 concentric with an axis 328 of the ratchet wheel 325. In exemplary embodiments, the central shaft 315 can have a circular or non-circular (e.g., hexagonal) cross section.

Figure 10:
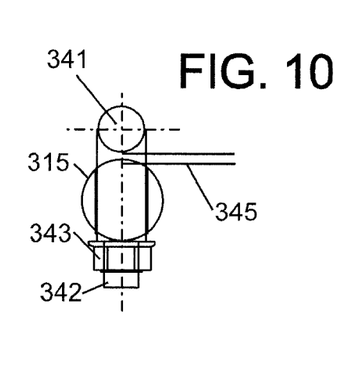
FIG. 10 illustrates a side view of the central shaft and the U-shaft of FIG. 9.
Figure 11A:
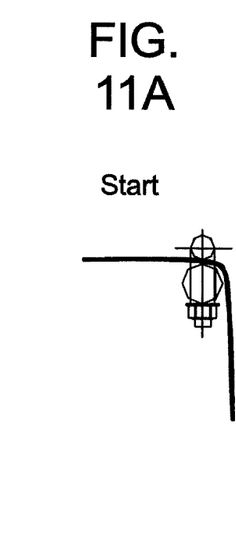
FIGS. 11A-11F illustrates a wrap sequence of the parallel shaft strap tie down apparatus of FIGS. 8-10 in accordance with exemplary embodiments.
Figure 11B:
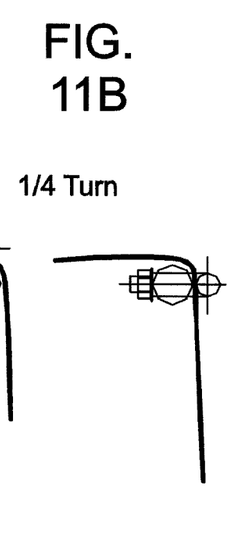
Figure 11C:
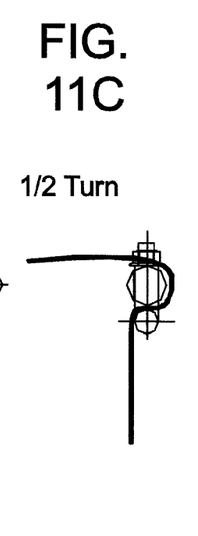
Figure 11D:
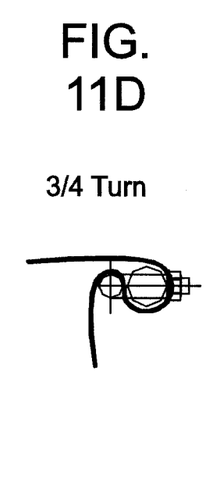
Figure 11E:
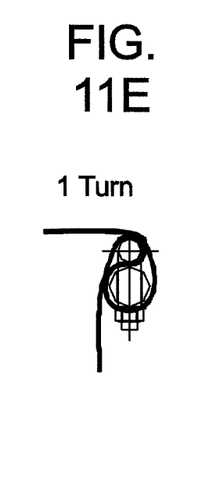
Figure 11F:
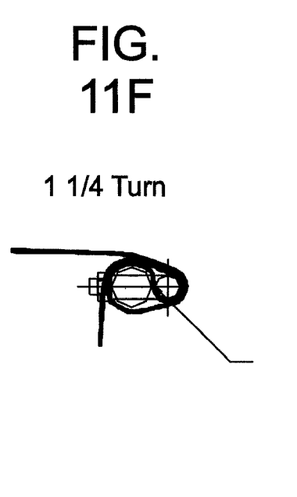

In exemplary embodiments, shaft holes 330 are spaced on the central shaft 315. An elongated U-shaft 340 having middle leg 341 and end legs 342 is positioned with respect to the central shaft 315. In an exemplary embodiment, the middle leg 341 is positioned parallel to the central shaft 315 and the end legs are positioned within the shaft holes 330. FIG. 10 illustrates a side view of the central shaft 315 and the U-shaft 340 of FIG. 9. In exemplary embodiments, the middle leg 341 and ends legs are contiguous, thereby forming a contiguous U-shape. In exemplary embodiments, the end legs 342 can be threaded and affixed with nuts 343 to fix the U-shaft 340 to the central shaft 315. In this way, the middle leg 341 can be in contact with the central shaft 315 or spaced away from the central shaft 315, which is generally dependent on the length of the end legs 342. It is appreciated that the length of the end legs 342 determines a width of a space 345 between the central shaft 315 and the middle leg 341. In exemplary embodiments, a strap 350 is confined to the space 345 between the end legs 342 laterally and the central shaft 315 and middle leg 341 radially. In exemplary embodiments, rotation of the central shaft 315 causes the middle leg 341 to pinch down on the strap 350, resulting in a self-tightening action. A winch end of the strap 350 is continuously adjustable. Ends of the strap 350 around the wheel 301 are incrementally adjustable in a series of slots 302 in the platform 305. In exemplary embodiments, a fixed hook 355 and an intermediate hook 360 can be placed in the appropriate slot 302 when positioning the wheel 301 on the platform prior to tightening the strap 350.

FIG. 11 illustrates a wrap sequence of the apparatus 310 as described herein. In a start position the strap 350 is positioned between the central shaft 315 and the middle leg 341. In the start position the middle leg 341 rests on the strap 350 that rests on the central shaft 315. In a ¼ turn, the end legs 342 may begin to move within the shaft holes 330 and away from the strap 350 and the central shaft 315. In a ½ turn, the middle leg 341 falls under the force of gravity from the strap 350 and the central shaft 315. In a ¾ turn, the middle leg 341 may begin to move toward the strap 350 and the central shaft 315 once again (and the end legs shifting within the shaft holes 330). In a full turn, the strap 350 comes into contact with itself and the middle leg 341 falls against the strap and the central shaft 315 under the force of gravity and a tension force of the strap 350 in its self-tightening response between the central shaft 315 and the U-shaft 340. Subsequent turns such as a 1¼ turn further tighten the strap 350 onto the central shaft 315 and U-shaft 340.

Figure 12:
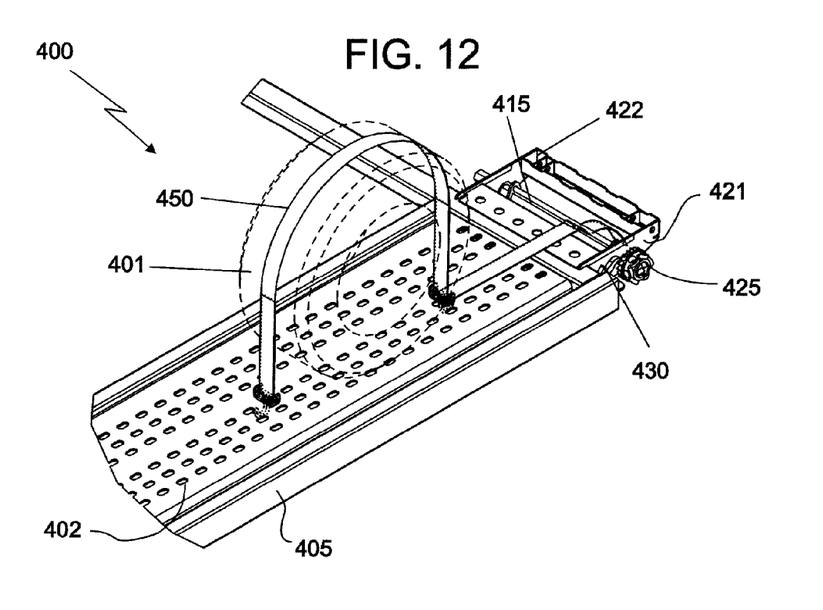
FIG. 12 illustrates a perspective view of an exemplary embodiment of a parallel shaft strap tie down system.
Figure 13A:
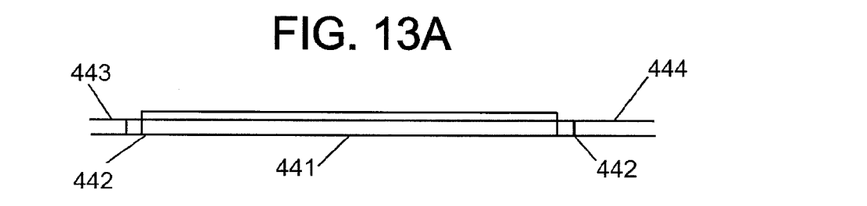
FIGS. 13A-13B illustrates a top down views of the parallel shaft strap tie down system of FIG. 12.
Figure 13B:
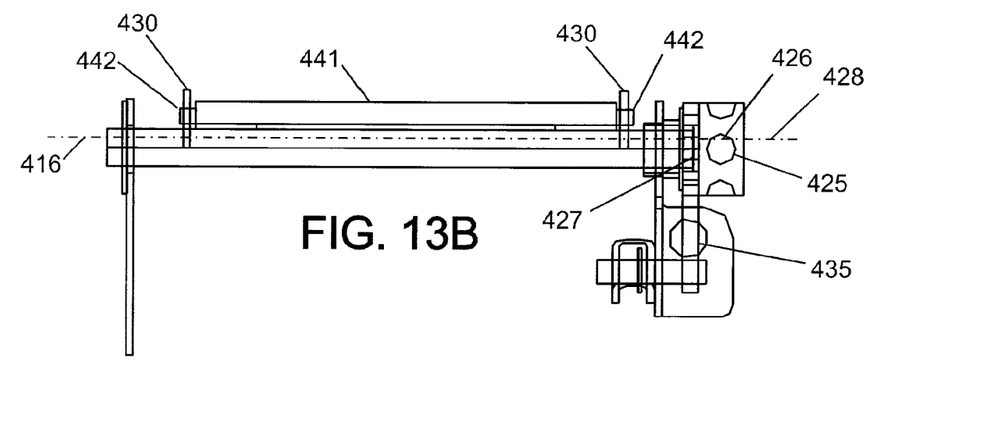

FIG. 12 illustrates a perspective view of an exemplary embodiment of a parallel shaft strap tie down system 400. The system 400 includes a platform 405 with a parallel shaft strap tie-down apparatus 410 coupled to the platform 405. FIG. 13 illustrates a top down view of the parallel shaft strap tie down apparatus 410 of FIG. 4. The apparatus 410 includes a central shaft 415 that is free to rotate with respect to the platform 405, and in between support plates 421, 422. The apparatus 410 includes a ratchet wheel 425 having wrench apertures 426 into which a tightening bar can be inserted to tighten the ratchet wheel as known in the art. The ratchet wheel 425 further includes engagement teeth 427 for engagement with a pawl 435 as known in the art. The ratchet wheel 425 is coupled to the central shaft 415 with a central axis 416 of the central shaft 415 concentric with an axis 428 of the ratchet wheel 425. In exemplary embodiments, the central shaft 415 can have a circular or non-circular (e.g., hexagonal) cross section.

Figure 14A:
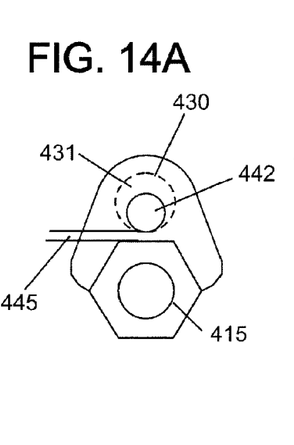
FIGS. 14A-14C illustrates a side views of the central shaft and shaft plates of FIG. 13.
Figure 14B:
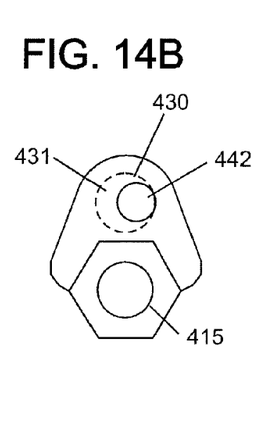
Figure 14C:
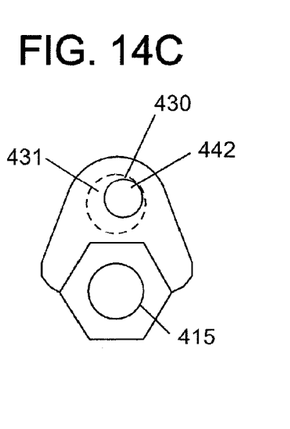
Figure 15A:
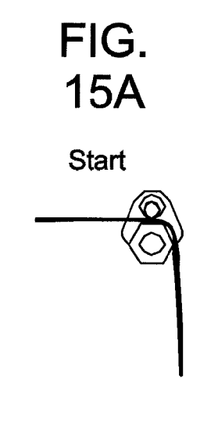
FIGS. 15A-15F illustrates a wrap sequence of the parallel shaft strap tie down apparatus of FIGS. 12-14 in accordance with exemplary embodiments.
Figure 15B:
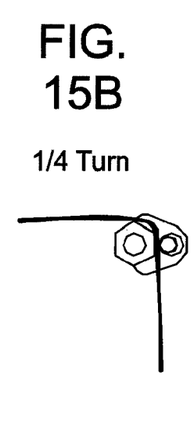
Figure 15C:
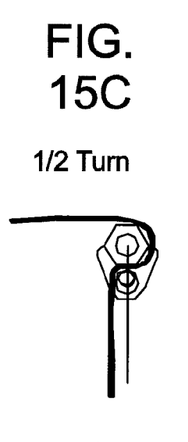
Figure 15D:
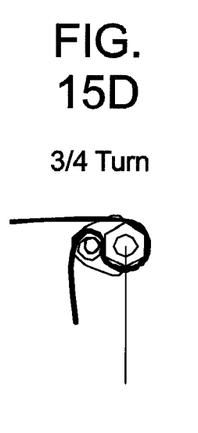
Figure 15E:
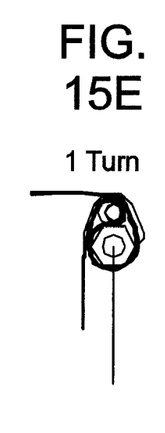
Figure 15F:
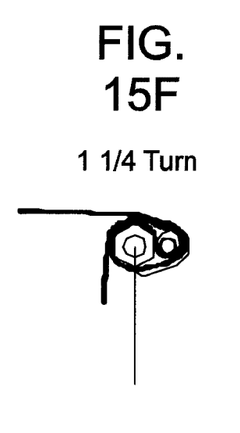

In exemplary embodiments, shaft plates 430 are coupled to the central shaft 415. In exemplary embodiments, the shaft plates 430 are coupled to the central shaft 415 orthogonally (e.g., perpendicular to the central shaft 215). FIG. 14 illustrates a side view of the central shaft 415 and shaft plates 430 of FIG. 13. The shaft plates 430 include holes 431. A parallel shaft 440 is positioned parallel to the central shaft 415 and is constrained by the holes 431. The parallel shaft includes a central portion 441 and ends 442, which are positioned within the holes 431. In exemplary embodiments, a radius of the central portion 441 is greater that a radius of the ends 442 and of the holes 431. In addition, the central portion 441 is not concentric with the ends 442. As such, an axis 443 of the central portion 441 is parallel with an axis 444 of the ends 442. In exemplary embodiments, the radius of the holes 431 is greater than the radius of the ends 442. In this way, the parallel shaft 440 can be in contact with the central shaft 415 or spaced away from the central shaft 415, depending on the position of the parallel shaft 440 within the holes 431. In exemplary embodiments, a strap 450 is confined to a space 445 between the shaft plates 430 laterally and the central shaft 415 and parallel shaft 440 radially. In exemplary embodiments, rotation of the central shaft 415 causes the parallel shaft 440 to pinch down on the strap 450, resulting in a self-tightening action. A winch end of the strap 450 is continuously adjustable. Ends of the strap 450 around the wheel 401 are incrementally adjustable in a series of slots 402 in the platform 405. In exemplary embodiments, a fixed hook 455 and an intermediate hook 460 can be placed in the appropriate slot 402 when positioning the wheel 401 on the platform prior to tightening the strap 450.

FIG. 15 illustrates a wrap sequence of the apparatus 410 as described herein. In a start position the strap 450 is positioned between the central shaft 415 and the parallel shaft 440. In the start position the parallel shaft 440 rests on the strap 450 that rests on the central shaft 415. In a ¼ turn, the parallel shaft 440 may begin to move within the slots 431 and away from the strap 450 and the central shaft 415. In a ½ turn, the parallel shaft 440 falls under the force of gravity from the strap 450 and the central shaft 415. In a ¾ turn, the parallel shaft 440 may begin to move toward the strap 450 and the central shaft 415 once again. In a full turn, the strap 450 comes into contact with itself and the parallel shaft 440 falls against the strap and the central shaft 415 under the force of gravity and a tension force of the strap in its self-tightening response between the central shaft 415 and the parallel shaft 440. Subsequent turns such as a 1¼ turn further tighten the strap 450 onto the central shaft 415 and parallel shaft 440.

Figure 16:
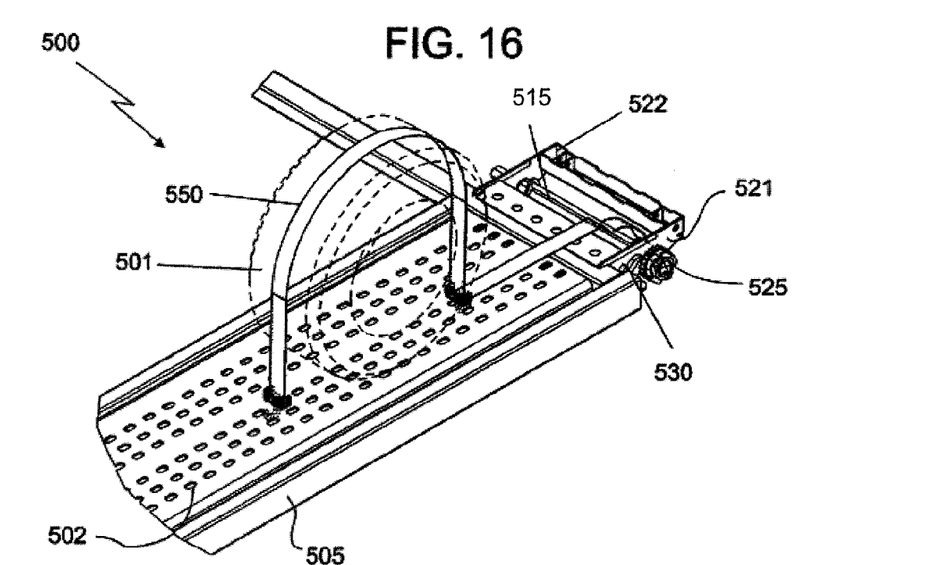
FIG. 16 illustrates a perspective view of an exemplary embodiment of a parallel shaft strap tie down system.
Figure 17A:
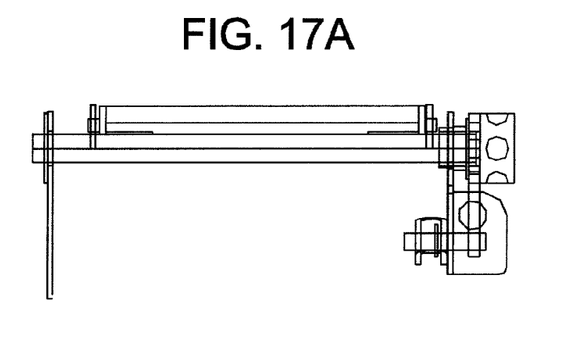
FIGS. 17A-17B illustrates a top down views of the parallel shaft strap tie down system of FIG. 16.
Figure 17B:
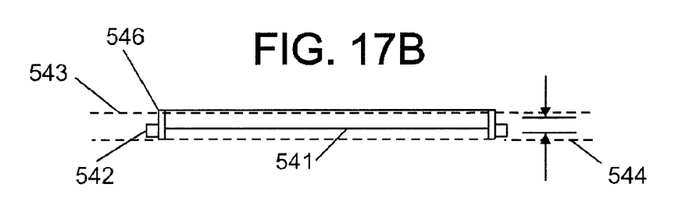

FIG. 16 illustrates a perspective view of an exemplary embodiment of a parallel shaft strap tie down system 500. The system 500 includes a platform 505 with a parallel shaft strap tie-down apparatus 510 coupled to the platform 505. FIG. 17 illustrates a top down view of the parallel shaft strap tie down apparatus 510 of FIG. 16. The apparatus 510 includes a central shaft 515 that is free to rotate with respect to the platform 505, and in between support plates 521, 522. The apparatus 510 includes a ratchet wheel 525 having wrench apertures 526 into which a tightening bar can be inserted to tighten the ratchet wheel as known in the art. The ratchet wheel 525 further includes engagement teeth 527 for engagement with a pawl 535 as known in the art. The ratchet wheel 525 is coupled to the central shaft 515 with a central axis 516 of the central shaft 515 concentric with an axis 528 of the ratchet wheel 525. In exemplary embodiments, the central shaft 515 can have a circular or non-circular (e.g., hexagonal) cross section.

Figure 18A:
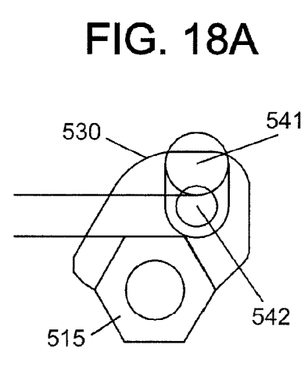
FIGS. 18A-18C illustrates a side views of the central shaft and shaft plates of FIG. 17.
Figure 18B:
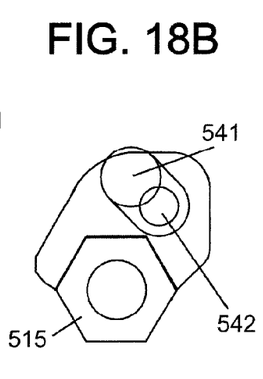
Figure 18C:
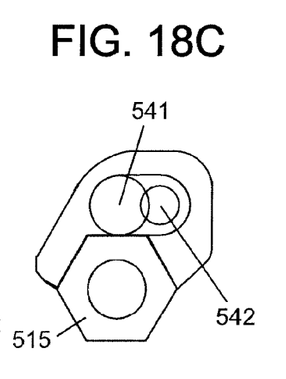
Figure 19A:
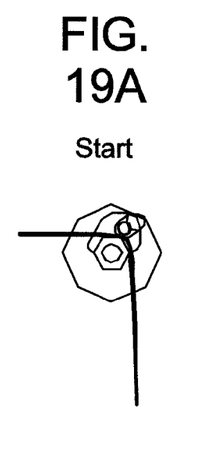
FIGS. 19A-19F illustrates a wrap sequence of the parallel shaft strap tie down apparatus of FIGS. 16-18 in accordance with exemplary embodiments.
Figure 19B:
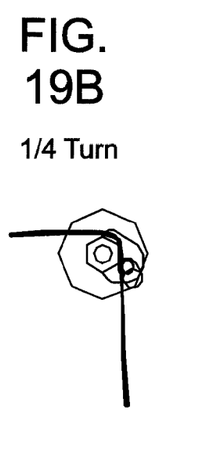
Figure 19C:
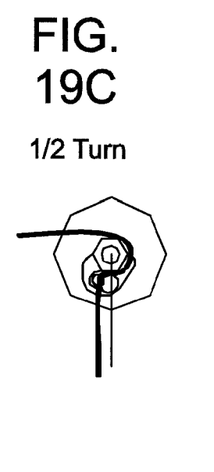
Figure 19D:
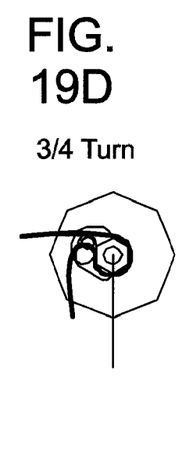
Figure 19E:
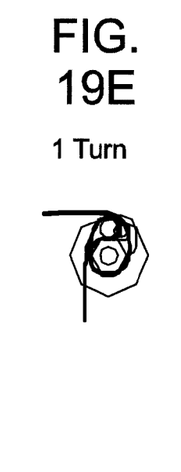
Figure 19F:
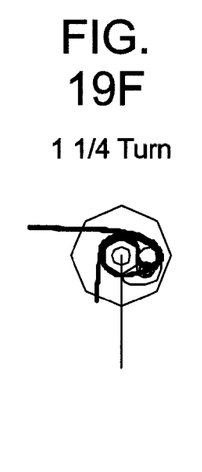

In exemplary embodiments, shaft plates 530 are coupled to the central shaft 515. In exemplary embodiments, the shaft plates 530 are coupled to the central shaft 515 orthogonally (e.g., perpendicular to the central shaft 515). FIG. 18 illustrates a side view of the central shaft 515 and shaft plates 530 of FIG. 17. The shaft plates 530 include slots 531. A parallel shaft 540 is positioned parallel to the central shaft 515 and is constrained by the holes 531. The parallel shaft includes a central portion 541 and ends 542, which are positioned within the holes 531. Spacer bars 546 are positioned between the central portion 541 and the ends 542, thereby providing a separation between axes 543, 544 of the central portion 541 and the ends 542, respectively. In exemplary embodiments, a radius of the central portion 541 is greater that a radius of the ends 542 and of the holes 531. In addition, the central portion 541 is not concentric with the ends 542. As such, the axis 543 of the central portion 541 is parallel with the axis 544 of the ends 542. In exemplary embodiments, the radius of the holes 531 is approximately equal to the radius of the ends 542. As such, the ends 542 rotate within the holes 531. In this way, the parallel shaft 540 can be in contact with the central shaft 515 or spaced away from the central shaft 515, depending on the rotation of the parallel shaft 540 within the holes 531, the spacing being determined by the rotation of the spacer bars 546. In exemplary embodiments, a strap 550 is confined to a space 545 between the shaft plates 530 laterally and the central shaft 515 and parallel shaft 540 radially. In exemplary embodiments, rotation of the central shaft 515 causes the parallel shaft 540 to pinch down on the strap 550, resulting in a self-tightening action. A winch end of the strap 550 is continuously adjustable. Ends of the strap 550 around the wheel 501 are incrementally adjustable in a series of slots 502 in the platform 505. In exemplary embodiments, a fixed hook 555 and an intermediate hook 560 can be placed in the appropriate slot 502 when positioning the wheel 501 on the platform prior to tightening the strap 550.

FIG. 19 illustrates a wrap sequence of the apparatus 510 as described herein. In a start position the strap 550 is positioned between the central shaft 515 and the parallel shaft 540. In the start position the parallel shaft 540 rests on the strap 550 that rests on the central shaft 515. In a ¼ turn, the parallel shaft 540 may begin to move within the slots 531 and away from the strap 550 and the central shaft 515. In a ½ turn, the parallel shaft 540 falls under the force of gravity from the strap 550 and the central shaft 515. In a ¾ turn, the parallel shaft 540 may begin to move toward the strap 550 and the central shaft 515 once again. In a full turn, the strap 550 comes into contact with itself and the parallel shaft 540 falls against the strap and the central shaft 515 under the force of gravity and a tension force of the strap in its self-tightening response between the central shaft 515 and the parallel shaft 540. Subsequent turns such as a 1¼ turn further tighten the strap 550 onto the central shaft 515 and parallel shaft 540.

Figure 20:
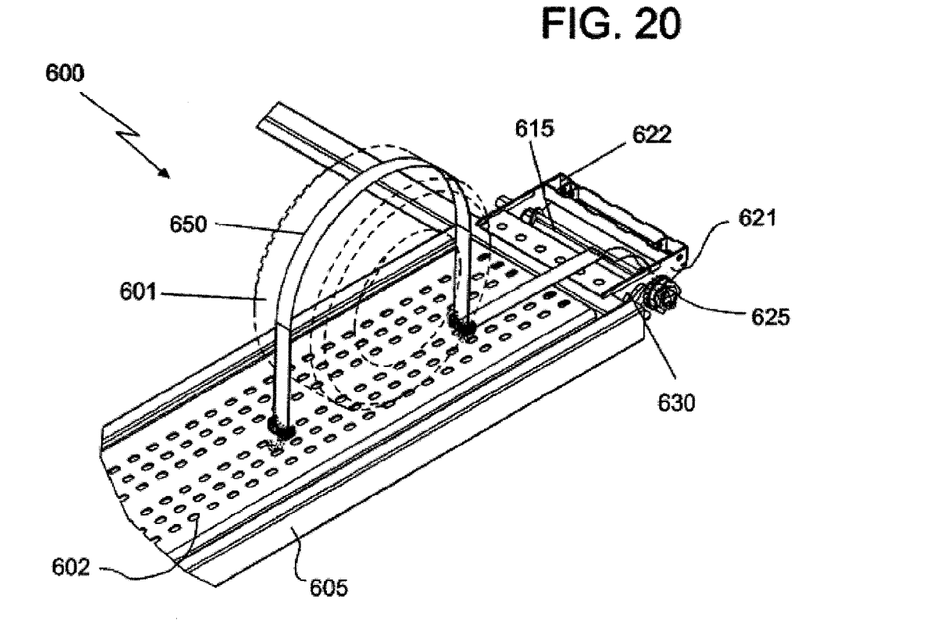
FIG. 20 illustrates a perspective view of an exemplary embodiment of a parallel shaft strap tie down system.
Figure 21:
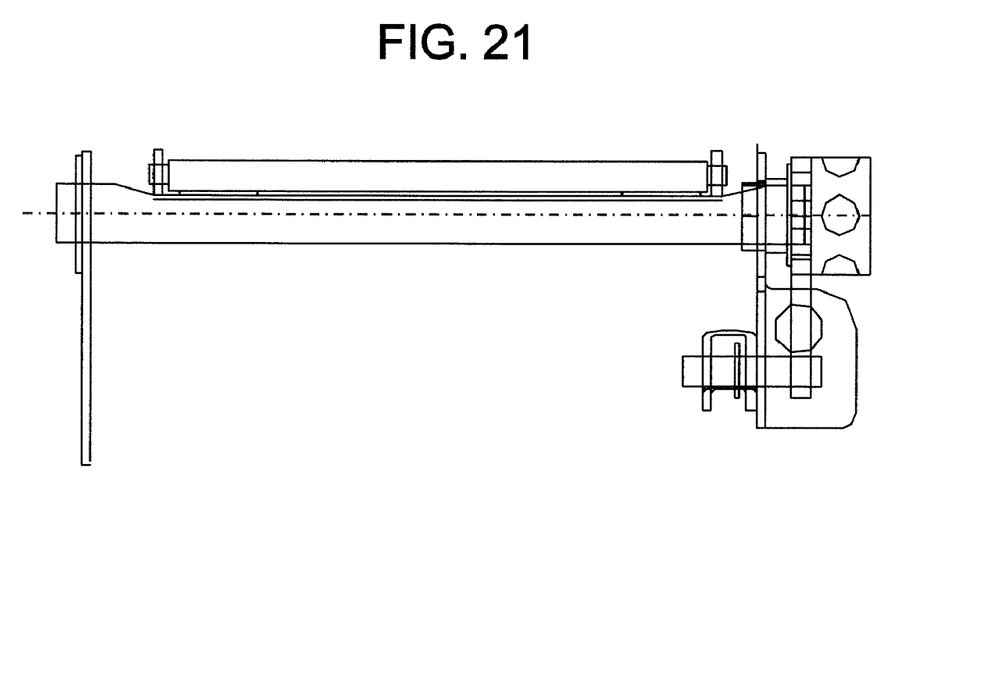
FIG. 21 illustrates a top down view of the parallel shaft strap tie down system of FIG. 20.

FIG. 20 illustrates a perspective view of an exemplary embodiment of a parallel shaft strap tie down system 600. The system 600 includes a platform 605 with a parallel shaft strap tie-down apparatus 610 coupled to the platform 605. FIG. 21 illustrates a top down view of the parallel shaft strap tie down apparatus 610 of FIG. 20. The apparatus 610 includes a central shaft 615 that is free to rotate with respect to the platform 605, and in between support plates 621, 622. The apparatus 610 includes a ratchet wheel 625 having wrench apertures 626 into which a tightening bar can be inserted to tighten the ratchet wheel as known in the art. The ratchet wheel 625 further includes engagement teeth 627 for engagement with a pawl 635 as known in the art. The ratchet wheel 625 is coupled to the central shaft 615 with a central axis 616 of the central shaft 615 concentric with an axis 628 of the ratchet wheel 625. In exemplary embodiments, the central shaft 615 can have a circular or non-circular (e.g., hexagonal) cross section.

Figure 22:
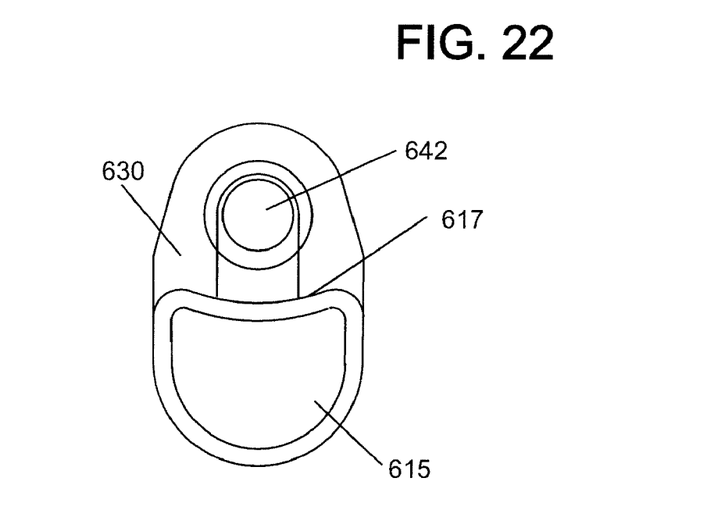
FIG. 22 illustrates a side view of the central shaft and shaft plates of FIG. 21.
Figure 23A:
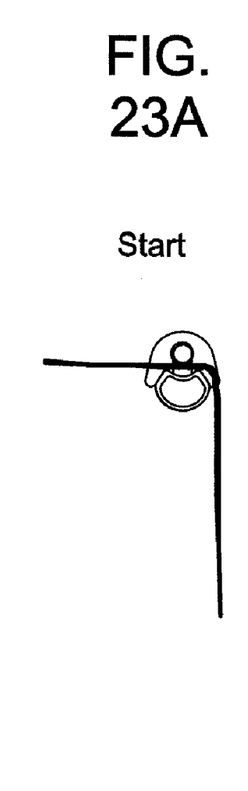
FIGS. 23A-23F illustrates a wrap sequence of the parallel shaft strap tie down apparatus of FIGS. 20-22 in accordance with exemplary embodiments.
Figure 23B:
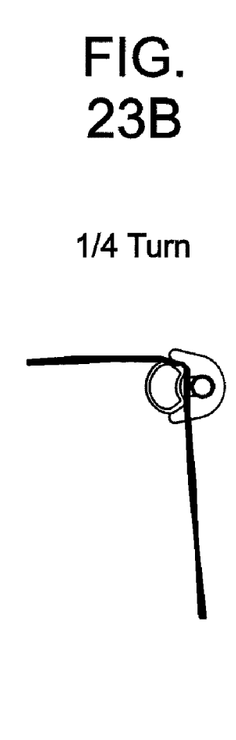
Figure 23C:
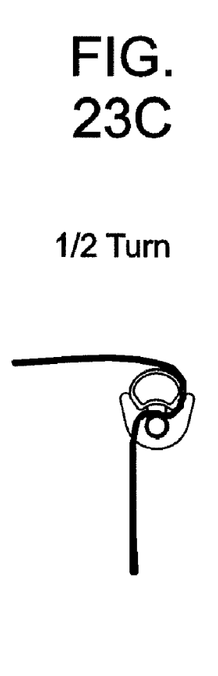
Figure 23D:
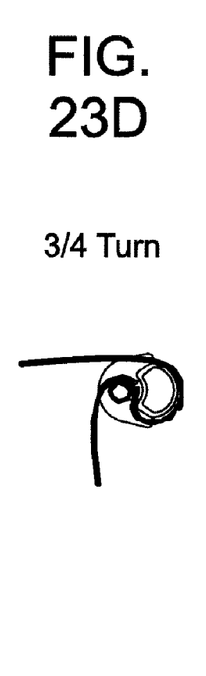
Figure 23E:
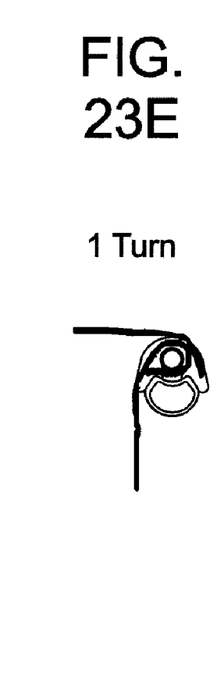
Figure 23F:
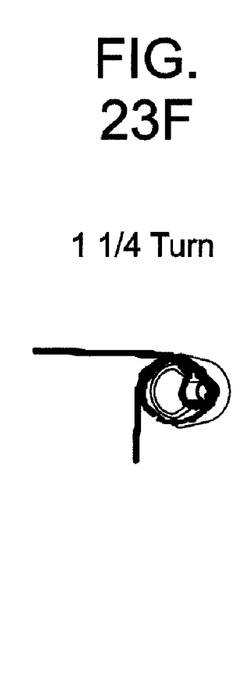

In exemplary embodiments, shaft plates 630 are coupled to the central shaft 615. In exemplary embodiments, the shaft plates 630 are coupled to the central shaft 615 orthogonally (e.g., perpendicular to the central shaft 615). FIG. 22 illustrates a side view of the central shaft 615 and shaft plates 630 of FIG. 21. The shaft plates 630 include slots 631. A parallel shaft 640 is positioned parallel to the central shaft 615 and is constrained by the slots 631. The parallel shaft includes a central portion 641 and ends 642, which are positioned within the slots 631. In exemplary embodiments, a radius of the central portion 641 is greater that a radius of the ends 642 and of the slots 631. In addition, the central portion 641 is concentric with the ends 642. In exemplary embodiments, the radius of the slots 631 is greater than the radius of the ends 642. In this way, the parallel shaft 640 can be in contact with the central shaft 615 or spaced away from the central shaft 615, depending on the position of the parallel shaft 640 within the slots 631. In exemplary embodiments, a strap 650 is confined to a space 645 between the shaft plates 630 laterally and the central shaft 615 and parallel shaft 640 radially. In exemplary embodiments, rotation of the central shaft 615 causes the parallel shaft 640 to pinch down on the strap 650, resulting in a self-tightening action. A winch end of the strap 650 is continuously adjustable. Ends of the strap 650 around the wheel 601 are incrementally adjustable in a series of slots 602 in the platform 605. In exemplary embodiments, a fixed hook 655 and an intermediate hook 660 can be placed in the appropriate slot 602 when positioning the wheel 601 on the platform prior to tightening the strap 650. As further illustrated in FIGS. 21 and 22, in exemplary embodiments, the central shaft 615 can further include an elongated depression 617. In exemplary embodiments, the shape of the elongated depression 617 approximately matches the shape of the parallel shaft 640. The parallel shaft 640 can contact the central shaft 615 in the elongated depression 617 when at its closest proximity in the slots 631. When at its furthest distance, the space 645 is formed that allows easy insertion of the strap 650 between the central shaft 615 and the parallel shaft 640. The elongated depression 617 in the central shaft 615 can further provide a smaller radial envelope when tightening the entire assembly, as compared to the central shaft 615 without the elongated depression 617. The elongated depression 617 can further provide improved contact and self-tightening action between the central shaft 615 and the parallel shaft 640 as compared with a central shaft 615 without the elongated depression 617. The mating of the parallel shaft to the depression in the main shaft further contributes to the strength and stiffness of the main shaft FIG. 23 illustrates a wrap sequence of the apparatus 610 as described herein. In a start position the strap 650 is positioned between the central shaft 615 and the parallel shaft 640. In the start position the parallel shaft 640 rests on the strap 650 that rests on the central shaft 615. In a ¼ turn, the parallel shaft 640 may begin to move within the slots 631 and away from the strap 650 and the central shaft 615. In a ½ turn, the parallel shaft 640 falls under the force of gravity from the strap 650 and the central shaft 615. In a ¾ turn, the parallel shaft 640 may begin to move toward the strap 650 and the central shaft 615 once again. In a full turn, the strap 650 comes into contact with itself and the parallel shaft 640 falls against the strap and the central shaft 615 under the force of gravity and a tension force of the strap in its self-tightening response between the central shaft 215 and the parallel shaft 640. Subsequent turns such as a 1¼ turn further tighten the strap 650 onto the central shaft 615 and parallel shaft 640.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A strap tie down system for a vehicle transporter having one or more vehicle platforms, the system comprising:
   a first shaft coupled to one of the one or more vehicle platforms;

shaft plates connected to and perpendicular to the first shaft, the shaft plates being at a fixed non-moveable position with respect to the first shaft;

a second shaft disposed between the shaft plates thereby positioning the second shaft parallel to the first shaft, wherein the second shaft is radially moveable with respect to the first shaft; and a ratchet wheel directly connected to an end of the first shaft, wherein the first shaft is configured to receive a strap that is adjustable longitudinal to the first shaft, wherein the second shaft includes a central portion having a first end and a second end, the first and second ends being at least one of concentrically and non-concentrically arranged with the central portion, wherein the first end and second end have a radius that is less than a radius of the central portion, wherein the first and second ends are disposed in slots disposed on the shaft plates.

* * * * *